United States Patent [19]

Debesis

[11] Patent Number: 4,840,443
[45] Date of Patent: Jun. 20, 1989

[54] HOLOGRAPHIC SCANNER SPINNER

[75] Inventor: John R. Debesis, Penfield, N.Y.

[73] Assignee: Eastman Kodak Company, Rochester, N.Y.

[21] Appl. No.: 200,289

[22] Filed: May 31, 1988

[51] Int. Cl.$^4$ .......................... G02B 5/32; G02B 26/10
[52] U.S. Cl. ..................................... 350/3.71; 350/6.2
[58] Field of Search ........................ 350/3.71, 6.1, 6.2

[56] References Cited

U.S. PATENT DOCUMENTS 4,787,688  11/1988  Rumfola ............................. 350/3.71

Primary Examiner—Bruce Y. Arnold
Assistant Examiner—David J. Edmondson
Attorney, Agent, or Firm—Armin B. Pagel

[57] ABSTRACT

A multi-facet holographic scanner spinner is described in which each facet has a sector shape, it being bounded by radial lines and, usually, the periphery of the holographic scanner spinner. Each facet includes a diffraction grating pattern. The pattern in each facet extends to the radial lines bounding the facet in regions between a first and a second, greater radial distance from the axis of the holographic scanner spinner, but is spaced from the radial lines in regions radially outwardly of the second radial distance. Thus, the width of each facet is no greater than is necessary to perform its function and is less than a prior art facet performing the same function.

3 Claims, 4 Drawing Sheets

PRIOR ART

INVENTION EMBODIMENT

INVENTION EMBODIMENT

HOLOGRAPHIC SCANNER SPINNER

BACKGROUND OF THE INVENTION

1. Field of the Invention

This invention relates to holographic scanner spinners.

2. Description Relative to the Prior Art

Holographic scanner spinners are devices which when positioned to intercept a stationary beam of light, such as from a laser diode, and rotated, cause the beam to scan. Holographic scanner spinners are known comprising a carrier substrate in the form of a disc, mountable for rotation about an axis at the center of the disc. The disc may be transparent or opaque depending on whether the holographic scanner spinner is of the transmission or reflection type. The disc may be regarded as divided onto a plurality of sector-shaped facets, that is, regions bounded by two radial lines extending radially from the axis of the disc and an arc concentric with the disc, the arc usually being a portion of the circular periphery of the disc. The angles included by the radial lines bounding each of the facets, are the same and sum to 360°. Each facet includes a diffraction grating pattern usually formed in a photoresist layer carried by the carrier substrate disc. The lines of the diffraction grating pattern of each facet may be "radial", that is, parallel to the radius which bisects the facet, or they may be "tangential", that is, perpendicular to the radius bisecting the facet. Usually, in a multi-facet holographic scanner spinner, the diffraction grating pattern of a facet does not extend to the center of the disc. This is so because the cross-section of the beam, which the holographic scanner spinner is intended to intercept, has finite dimensions and hence its path on the holographic scanner spinner has to be spaced from the center of the disc otherwise the beam would always be incident on a plurality of facets, which, for many purposes, would be a useless condition. The diffraction grating pattern usually extends to the periphery of the disc or to a circle concentric with the disc and having a radius only slightly smaller than that of the disc. Thus, each diffraction grating pattern has usually had a shape bounded by parts of two radii and by inner and outer concentric arcs. Recently, there has been a proposal that each grating pattern should have an arcuate extent slightly greater than the arcuate extent of the facet so that the grating patterns of adjacent facets slightly overlap one another while the facets are only contiguous.

Many ways of making diffraction ratings are known. Ten ways are shown on page 101 of Diffraction Gratings by M. C. Hutley published in 1982 by Academic Press. In all of these ways, it is inherent that the larger the diffraction grating pattern, the larger must be the cross-section of the beam of light which is split and interfered with itself. One of the ways for producing diffraction gratings disclosed in the aforementioned book, is illustrated in FIG. 1 of the accompanying drawings. It will be observed that a beam 20 of coherent radiation from a laser, is directed at a prism 22. The portion of the beam 20 incident on facet 24 of the prism 22 is refracted downwards and the portion of the beam incident on the facet 26 is refracted upwards. The two portions of the beam interfere in the air space, contiguous with the base 28 of the prism, after they emerge from the base 28, and create a straight line interference pattern in that air space. Designated by 30 is a plane, parallel with the base 28 of the prism 22, in which lies the interference pattern having the greatest area. It will be observed that the maximum dimension d of the diffraction pattern which can be created on the plane 30 is directly related to the dimension D of the laser beam. Obviously if the interference patterns can be made smaller, the optical system used to create the interference patterns can also be smaller and hence less costly and probably more accurate.

FIGS. 2 and 2a illustrate a known holographic scanner spinner 32 comprising a substrate carrier disc 31 of rigid material having thereon a coating 29 of photoresist material. The disc 31 has a central aperture 27, for cooperation with a mounting and drive shaft (not shown) on an axis 33. The holographic scanner spinner has six facets 34, bounded by radial lines 35, each having an included angle of 60°. Each facet 34 includes a diffraction grating pattern 36 bounded by arcs of inner and outer circles 38 and 40, respectively, which are concentric with the holographic scanner spinner 32. The diffraction lines 42 of one pattern are represented in FIG. 2, on a greatly enlarged scale, of course, and are shown in one facet only. It will be observed that the lines 42 are parallel to the radius 43 which bisects the facet of which they are part. Thus, the illustrated holographic scanner spinner is a "radial holographic scanner spinner".

FIG. 3 illustrates a known mask 44 for defining the extent of the diffraction grating pattern to be created in each facet 34 of the holographic scanner spinner 32. The mask has an aperture 46 which is identical in shape and size to the diffraction rating pattern to be created in each facet. The mask 44 also has a center point 48 which is the point of intersection of the lines of the two sides 47 of the aperture.

For making a holographic scanner spinner, the mask 44 is placed against a substrate carrier disk coated with photoresist and with the center 48 of the mask 44 coincident with the axis 33 of the disc. The prism 22 is so disposed that the disc takes the place of the plane 30 illustrated in Fig. 1, and the interference pattern fills the aperture 46. The edge 23 of the prism is disposed so that it is parallel to the radius 43 bisecting the facet. The prism and the dimension D of the light beam 20 are both big enough that the entire aperture 46 is illuminated and an interference pattern is created on the entire area of the photoresist uncovered by the aperture in the mask 44. After exposure, the disc is rotated through exactly 60° and another exposure is made. This step and expose process is repeated until all six facets have been exposed. Thereafter the photoresist is etched and a holographic scanner spinner results.

FIG. 4 represents one facet 34 of the holographic scanner spinner which, for the purpose of the description, will be regarded as rotating counterclockwise, as indicated by the arrow 50. Also shown in FIG. 4 is the spot 52 created by the collimated beam of laser light which is to be converted from a stationary beam into a scanning beam by the rotating holographic scanner spinner. In this example, the spot is elliptical but, as is known, the spot may have other shapes.

SUMMARY OF THE INVENTION

It is an object of the present invention to allow a holographic scanner spinner to be produced more economically than previously or to be made economically with greater quality.

This object is achieved by the present invention by a holographic scanner spinner, each facet of which as the same effective dimension but smaller maximum dimension considered circumferentially, whereby the optical system may be smaller or the same size optical system may be operated in a manner which allows higher quality to be achieved with the same size, and hence cost, of optical system.

According to the present invention in a holographic scanner spinner including a disc having an axis and a plurality of sector-shaped facets bounded by radial lines extending radially from the axis, each facet having a diffraction grating pattern, each pattern extends to the two radial lines bounding its facet in regions between a first and a second, greater radial distance from the axis and is spaced from the two radial lines in regions radially outwardly from the second radial distance. Generally, the aforesaid second radial distance is related to the radius of that circular path (termed herein "beam path") traveled by the widest portion of the beam over the holographic scanner spinner. The term widest is intended to describe the largest dimension in the sense circumferentially of the holographic scanner spinner. It is at the intersection of the beam path with the radial line which is the boundary between adjacent facets, that the spot, created by the beam on the holographic scanner spinner, when on one facet, initially extends on to an adjacent facet as the holographic scanner spinner rotates in the beam. As long as the spot extends onto a second facet, the system including the holographic scanner spinner is useless for many purposes for which such systems are used. This uselessness is because the beam incident on two facets is split into two differently directed scanner beams. It is only when the holographic scanner spinner has rotated sufficiently that the spot is again in only one facet that the system becomes useful again. Thus, there is no need for the diffracting rating to exist in regions of each facet which are traversed by the spot only when the spot is resident on two facets. Two such regions exist radially outwardly from the aforesaid beam path and contiguous with the facet-bounding radial lines. It is in these regions that the facet has the greatest width dimension, width being defined as a dimension measured perpendicularly to the radius bisecting the sector. Thus, in embodiments of the present invention, the width of the grating pattern may be the same at radial distances greater than the aforesaid second radial distance as it is at the second radial distance. Thus, a holographic scanner spinner in accordance with the present invention, having a performance identical to a holographic scanner spinner in accordance with the prior art, has grating patterns whose maximum widths are smaller, Hence, the grating patterns may be created with a smaller optical system or may have superior quality when made with the same optical system.

BRIEF DESCRIPTION OF THE DRAWINGS

An embodiment of the present invention will now be described, by way of example, with reference to the accompanying drawings of which FIGS. 1 to 4 illustrate Prior Art, and in which:

FIG. 1 diagrammatically represents one of many ways of creating an interference pattern, suitable for use in manufacturing a holographic scanner spinner;

FIG. 2 diagrammatically represents a known holographic scanner spinner having six facets;

FIG. 3 diagrammatically represents a know mask for use in making the known holographic scanner spinner represented in FIG. 2;

FIG. 4 is an illustration of an elliptical spot created by a beam where it is incident on a facet of a known holographic scanner spinner;

DETAILED DESCRIPTION OF THE PREFERRED EMBODIMENT

Figure 1:
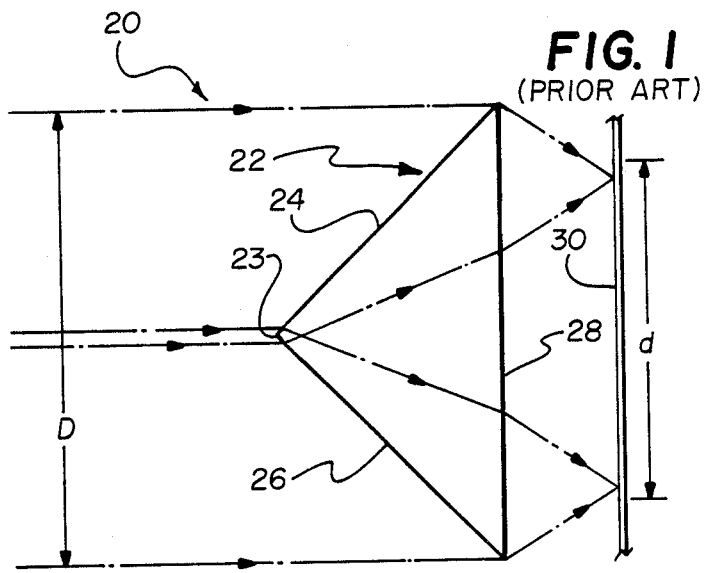

In the ensueing description of an embodiment of the present invention, and of a mask for use in forming a holographic scanner spinner in accordance with the present invention, parts, components and other features will be given the same reference numerals as the parts, components and other features to which they respectively correspond in the above description relative to the prior art, but with the reference numeral raised by 100. Thus, for example, the aperture in the mask of the prior art has the reference numeral 46 and the reference numeral for the aperture in the mask for making a holographic scanner spinner in accordance with the present invention is 146.

Figure 2:
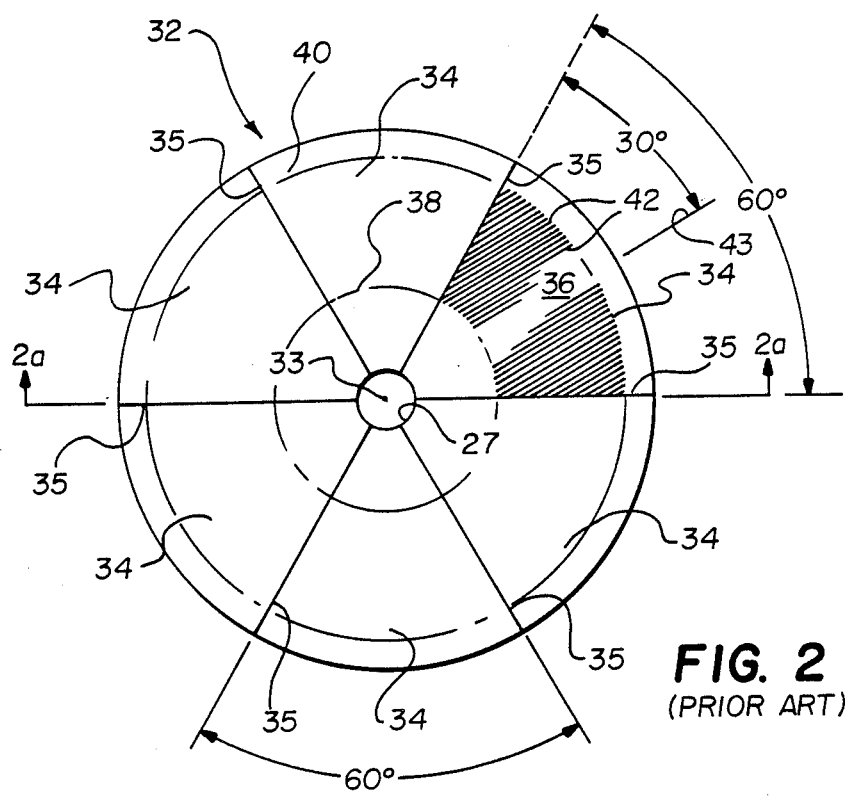
Figure 2A:
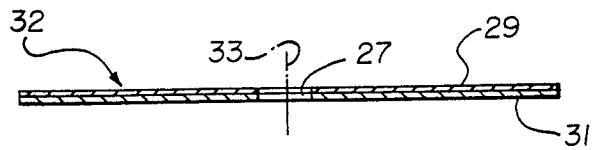
FIG. 2a is a cross-section view taken on the line 2a-2a in FIG. 2.
Figure 3:
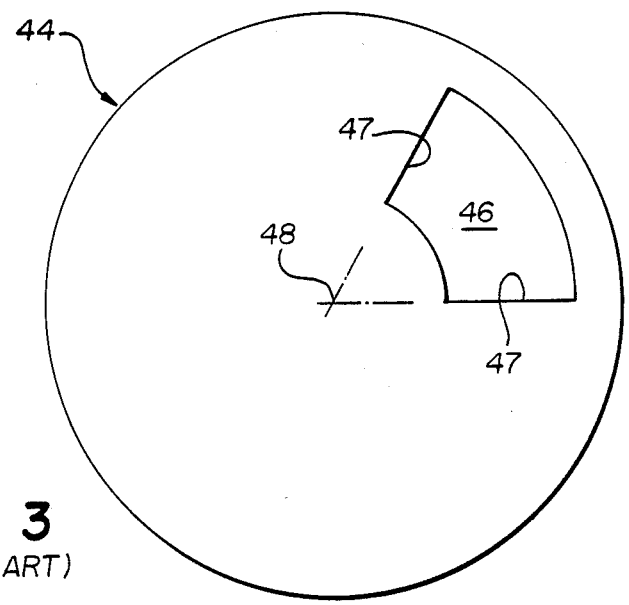
Figure 5:
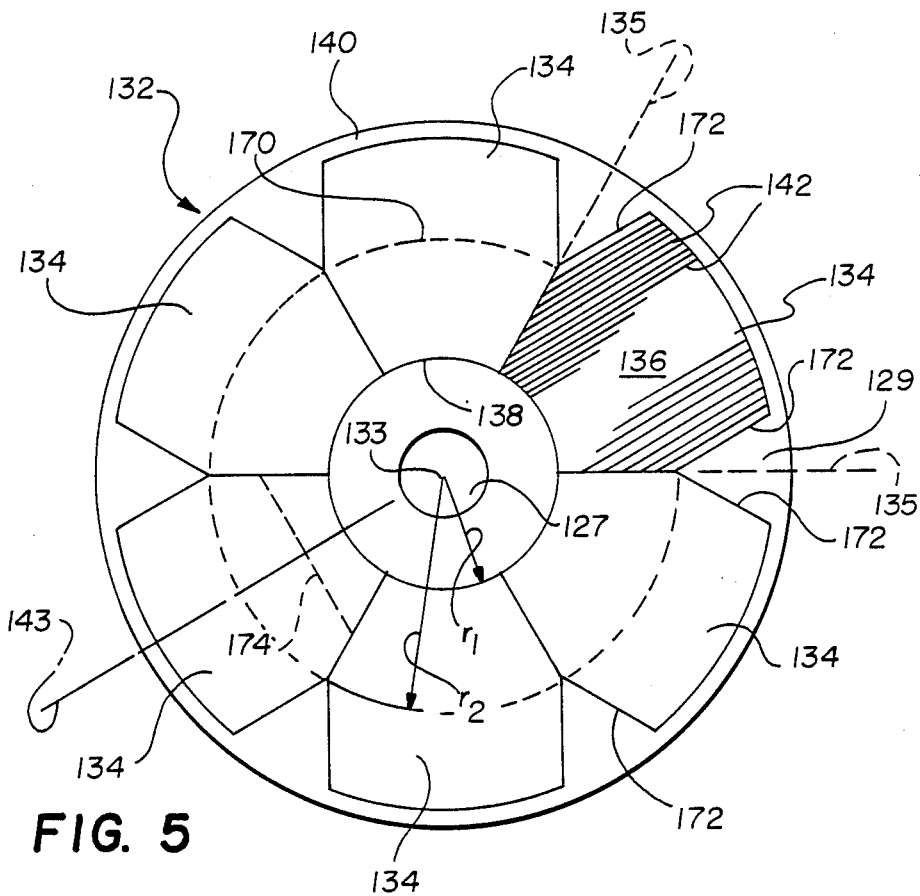
FIG. 5 illustrates a holographic scanner spinner in accordance with the present invention.

In FIG. 5 of the accompanying drawings, there is illustrated a holographic scanner spinner 132 in accordance with the present invention. The holographic scanner spinner 132 includes a substrate carrier disc, formed of rigid material, for example, glass, and similar to the disc 37 illustrated in FIG. 2a. There is a coating 129 of photoresist material on the disc. The disc has a central aperture 127, again for cooperation with a mounting and drive shaft on an axis 133. The holographic scanner spinner 132 has six facets 134, bounded by radial lines 135, each having an included angle of 60°. Each facet 134 includes a diffraction grating pattern 136. In accordance with the present invention, the facets 134 differ from the facets 34 in that the diffraction grating patterns 136 do not occupy entirely the regions bounded by arcs of inner and outer circles 138 and 140, respectively, which are concentric with the axis 133, and by adjacent facet-bounding radial lines 135. In accordance with the present invention, each of the diffraction grating patterns 136 occupies a region bounded by (a) circles 138 and 140; (b) portions of radial lines 135 extending between the circle 138 and another circle 170; and (c) lines 172 extending between the circle 170 and the circle 140, which lines 170 are parallel to the radius 143 bisecting the facet 124. The circle 138 has a first radius r1 and the circle 170 has a larger radius r2. Thus, the diffraction grating pattern extends to the two radial lines bounding its facet in regions between a first radial distance r1 and a second, greater radial distance r2 but is spaced from the radial lines 135 in regions radially outwardly from the second radial distance r2. Thus, with the width of the pattern being regarded as the dimension in the direction perpendicular to the radius bisecting the facet, then the width of the pattern is at least as great as the width of the facet out to approximately the beam path (as defined above), and is less than the width of the facet radially outwardly from the beam path. It is said that the pattern has a width "at least as great as" the width of the facet because there has been a recent proposal for adjacent diffraction grating patterns to overlap slightly at, and to each side of, the radial line defining the border between adjacent facets and in such cases the pattern has a "width" somewhat greater than the width of the facet where there is such overlap. Thus, when it is said in this specification that a grating pattern extends to a radial line, it is to be understood that the term extends to does not mean that the grating pattern ceases at the radial line. Thus, "extends to" includes extending beyond.

Figure 4:
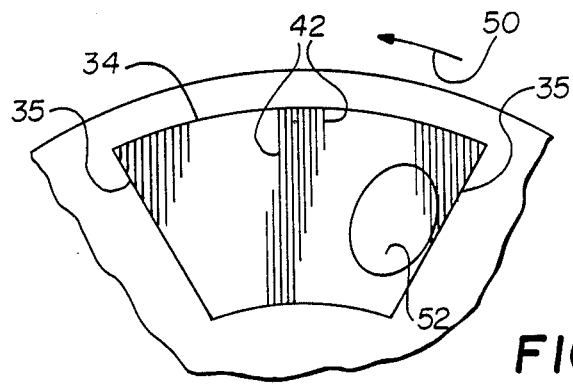
Figure 6:
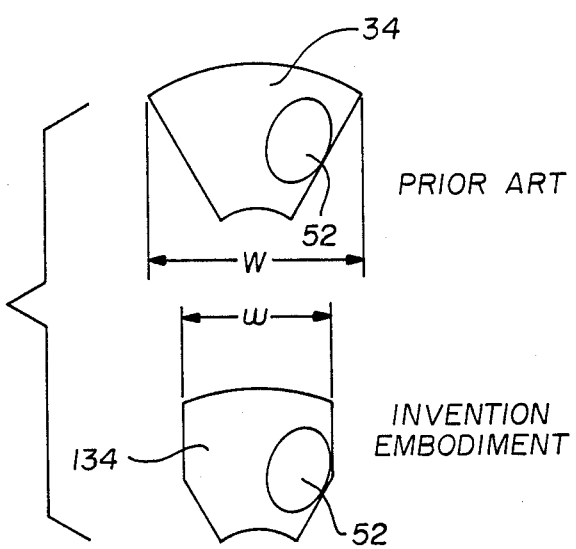
FIG. 6 shows a comparison between a known holographic scanner spinner facet and a holographic scanner spinner facet in accordance with the present invention.
Figure 7:
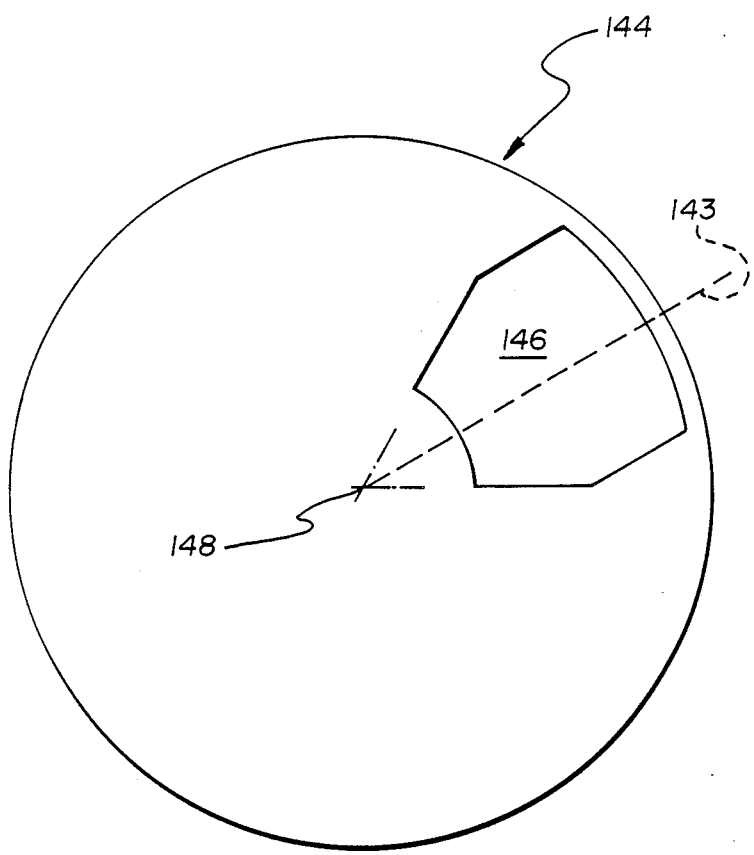
FIG. 7 illustrates a mask, similar to the mask illustrated in FIG. 3, but for use in forming a holographic scanner spinner in accordance with the present invention.

FIG. 6 illustrates a diffraction grating pattern 134 of a holographic scanner spinner in accordance with the present invention (labelled "invention embodiment" in the lower part of the Figure) and a pattern 34 in accordance with the prior art (labelled "prior art" in the upper part of the Figure). The upper part of the Figure is, of course, similar to FIG. 4. FIG. 6 serves to demonstrate how two facets, which perform identically in use, have different maximum widths (width being as defined above). The maximum width of the pattern of the prior art holographic scanner spinner is W an the maximum width of the pattern of the holographic scanner spinner in accordance with the present invention is the smaller dimension w.

In one embodiment of the present invention, which has been constructed, the following dimensions exist:

radius of circle 140 which is the radially outer boundary of each grating pattern.... 2,188";

radius r1 of the circle 138 which is the radially inner boundary of each grating pattern....0.7000"

radius r2 of the circle 170 (the beam path).... 1.465"

number of facets....6 width w (i.e. maximum width of grating pattern; see FIG. 6)....1.465".

If the holographic scanner spinner had not embodied the present invention, then the following value would have existed:

width W (i.e. maximum width of grating pattern; see FIG. 6)....2.,188";

Thus, in the example for which specific dimensions are given above, it will be observed that the present invention allows the maximum width of each facet to be reduced from 2.188" to 1.465: which is a 33% reduction. Because each grating pattern is smaller, the optical system used to create the patten may be smaller and hence cheaper. Also, if the optical system illustrated in FIG. 1 is used to make the grating patterns, the waist of the exposing beam can be reduced, if radial type grating patterns are being produced. Reduction in the beam size decreases the exposure time which allows a higher rate of production as well as a reduction in cross scan error. The cross scan error can be reduced because the grating constant varies less from facet to facet. It has been found that the primary cause of variation in grating constant is drift in the exposing system during the time the several facets of one holographic scanner spinner are being exposed. It has been found that the shorter the time to complete the exposure of all the facets of one holographic scanner spinner, the less drift there will be and the less variation there will be in the grating constant of the patterns in the one holographic scanner spinner. Also it has been found in some embodiments that there is a slight improvement in diffraction efficiency uniformity across each grating pattern. It is believed that this improvement may be due to improve developer kinetics adjacent the edge of the grating pattern where it is not contiguous with another grating pattern, that is, radially outwardly from the circle 170.

Instead of taking the benefit of the present invention as a reduction in cost of the optical system for creating the grating patterns, the benefit may be taken as the ability to create radial holographic scanner spinners with larger grating patterns, with an optical system which, prior to the present invention, could make only smaller grating patterns, and to achieve in those larger grating patterns the same quality as was achieved in the smaller grating patterns. Those familiar with holographic scanners known that, in many uses, advantages are achieved from reducing the size of the scanned spot of light. They will also known that if the scanned spot size is reduced, the size of the spot on the holographic scanner spinner has to be increased. If the spot size on the holographic scanner spinner is increased, it is probably necessary to increase the facet and grating pattern sizes. Thus, there is a great desire to increase grating pattern sizes with reasonable cost and good quality.

The invention has been described in detail with particular reference to a presently preferred embodiment, but it will be understood that variations and modifications can be effected within the spirit and scope of the invention.

What is claimed is:

1. A holographic scanner spinner including a disc having an axis and a plurality of sector-shaped facets bounded by radial lines extending radially from said axis, each facet having a diffraction grating pattern, each pattern extending to the two radial lines bounding its facet in regions between a first, and a second, greater radial distance from said axis and being radially spaced from said two radial lines in regions radially outwardly from said second radial distance.

2. A holographic scanner spinner as claimed in claim 1, wherein said second radius is approximately the radius of the path of the widest portion of the beam, over the holographic scanner spinner, in use.

3. A holographic scanner spinner as claimed in claim 1, wherein the width of the pattern outwardly from said second radius is the same as the width of the pattern at said second radius.

* * * * *